United States Patent
Grab et al.

(10) Patent No.: US 8,170,811 B2
(45) Date of Patent: May 1, 2012

(54) DRIVE DEVICE COMPRISING A DRIVE SHAFT AND A DEVICE FOR DETECTING TORQUE

(75) Inventors: Harald Grab, Hannover (DE); Michael Pausch, Oberwerrn (DE)

(73) Assignee: Schaeffler KG, Herzogenaurach (DE)

( * ) Notice: Subject to any disclaimer, the term of this patent is extended or adjusted under 35 U.S.C. 154(b) by 264 days.

(21) Appl. No.: 12/600,116

(22) PCT Filed: May 8, 2008

(86) PCT No.: PCT/DE2008/000803
§ 371 (c)(1),
(2), (4) Date: Nov. 13, 2009

(87) PCT Pub. No.: WO2008/138322
PCT Pub. Date: Nov. 20, 2008

(65) Prior Publication Data
US 2010/0305879 A1    Dec. 2, 2010

(30) Foreign Application Priority Data

May 16, 2007  (DE) .......................... 10 2007 023 109
Sep. 28, 2007  (DE) .......................... 10 2007 046 749

(51) Int. Cl.
*G01L 3/00*      (2006.01)
*G21C 17/00*    (2006.01)

(52) U.S. Cl. ............. 702/44; 702/56; 702/116; 702/182
(58) Field of Classification Search .............. 702/44–46, 702/56–62, 182–183
See application file for complete search history.

(56) References Cited

U.S. PATENT DOCUMENTS

| 5,442,966 A | 8/1995 | Hase et al. |
| 5,816,599 A * | 10/1998 | Soejima et al. ............... 280/259 |
| 2005/0193834 A1 | 9/2005 | May |

FOREIGN PATENT DOCUMENTS

| EP | 0 765 804 A | 4/1997 |
| EP | 1046893 | * 4/2000 |
| EP | 1 046 893 AY | 10/2000 |
| JP | 2000 335476 X | 12/2000 |

* cited by examiner

*Primary Examiner* — Phuong Huynh
(74) *Attorney, Agent, or Firm* — Lucas & Mercanti, LLP; Klaus P. Stoffel (57) ABSTRACT

A drive device, which has a drive shaft mounted in such a way as to rotate about an axis, two driving cranks which are connected to the drive shaft in an angularly rigid manner in relation to the axis in the peripheral direction, and an output element which is connected to the drive shaft and transmits torque between the drive shaft and a load element. To enable the measurement of the torque transmitted by the shaft as easily and economically as possible, the drive device has at least one magnetostrictive sensor which is connected to the drive shaft in a fixed manner and axially arranged between a driving crank and the output element.

18 Claims, 9 Drawing Sheets

DRIVE DEVICE COMPRISING A DRIVE SHAFT AND A DEVICE FOR DETECTING TORQUE

This application is a 371 of PCT/DE2008/000803 filed May 8, 2008, which in turn claims the priority of DE 10 2007 023 109.3 filed May 16, 2007, and DE 10 2007 046 749.6, filed Sep. 28, 2009 the priority of these applications is hereby claimed and these applications are incorporated by reference herein.

FIELD OF THE INVENTION

The invention relates to the field of machine engineering and of measuring technology. It can be applied in various types of drive devices such as, for example, bicycles, ergometers, pedelecs or other devices which can be driven by means of driving cranks. The invention also relates to a drive device and to a device which can be driven with at least one driving crank, in particular a bicycle, an ergometer or a pedelec.

BACKGROUND OF THE INVENTION

In such devices it may be appropriate to collect different variables such as, for example, the speed and the distance travelled in bicycles. For example, the current speed can give the rider an indication as to whether it is appropriate to select a specific speed-transforming gear speed or not.

However, for such a decision, it is appropriate to determine not only the speed, but also the currently applied torque in order to determine the force loading on the parts of the bicycle and the force which is applied by the rider and which is equivalent to the loading on his skeleton, musculature and joints. These variables can also be decisive for the selection of a transmission ratio or else for the decision to activate an auxiliary drive.

In addition, the power which is input into the drive shaft can be determined directly from the rotational speed of the drive shaft in conjunction with a measured torque.

Various possibilities for detecting the torque or torsion are known from the prior art, and a number thereof are also specialized particularly for application with driving cranks, in particular foot pedals in bicycles.

DE 102005018286 A1 discloses a device for determining a torque which is applied to a shaft, wherein a multi-pole magnetic ring is provided in a first shaft section of the shaft, and a stator mount with stator elements and fingers protruding in the axial direction is provided in a second shaft section. By means of a magnetic flux ring, magnetic fluxes are closed to a greater or lesser degree depending on the relative rotation of the shaft parts, with the result that the rotational angle, which is a measure of the torsional forces, is measured.

DE 10225018293 A1 discloses a torque sensor in which a magnet and a sensor unit are each independently attached to two sections of the shaft, wherein the sensor unit acts as proximity switch and indicates a rotation of the shaft as a change in position of the magnet.

DE 102005023182 A1 presents a torque-detection device having a torque-transmission plate for transmitting a torque between an engine output element and a torque converter drive element, wherein the transmission plate can easily be deformed elastically as a result of a torque by means of targeted weakened portions, and wherein strain gages for confirming the elastic deformation are provided on deformable webs of the transmission plate. Said document does not contain anything else about the functioning of the strain gages.

DE 102005041287 A1 presents a torque sensor comprising two component shafts, with each of the component shafts being connected to what is referred to as a recording tube and the recording tubes being coaxial to one another. They are permanently connected to the component shafts at points which are spaced apart from one another, and they have circumferential teeth on the end side so that given a greater or lesser degree of rotation of the shaft components the magnetic resistance between the recording tubes is periodically changed depending on the correspondence of the teeth. As a result, rotation of the component shafts with respect to one another can be detected. This is a measure of the acting torsional forces.

DE 10044701 C1 discloses a transmission device on the pedals of a bicycle, by means of which the pedal force is transmitted to the foot pedal. An elastic element in the form of a spring is compressed by the transmission of force, and this force effect is measured in order to determine the transmitted torque therefrom.

DE 69900898 T2 discloses, on the one hand, the connection of magnetostrictive elements for measuring torsion, wherein a magnetic material is intended to convert the torsion into an electrical voltage.

The main subject matter of the document is, on the other hand, the measurement of a torque by means of two commonly mounted disks which are coupled by means of spring elements acting in the rotational direction. The transmitted torque between the two disks can be determined by means of the angular offset which is achieved.

EP 1046893 B1 discloses basically the use of the magnetostrictive effect for the measurement of torque and the attachment of a magnetostrictive annular element to a shaft in order to transmit the torque and to utilize the effect. However, said document does not describe any structure which is directly related to the design of a roller bearing into which a torque sensor is integrated. For the measurement of the magnetic field, a specific sensor is described by means of which the current is measured at high frequency in the case of saturation magnetization of a probe in various magnetization directions, as a result of which the magnetic field of the magnetostrictive element can be measured precisely.

SUMMARY OF THE INVENTION

Against this background, the object of the present invention is to find a way which is as structurally simple and cost-effective as possible of measuring the torque transmitted by the drive shaft in a drive device comprising a drive shaft mounted so as to rotate about an axis, and comprising two driving cranks connected to said shaft in the circumferential direction with respect to the axis in an angularly rigid manner, and comprising an output element which is connected to the shaft and has the purpose of transmitting torque between the drive shaft and a load element.

By virtue of the fact that at least one magnetostrictive sensor is permanently connected to the drive shaft, said sensor shares any torsional loading which is transmitted in the axial section of the shaft in which it is attached.

The torque is usually applied by means of a driving crank and transmitted on the output element by means of further mechanical elements which are coupled thereto. It is therefore appropriate to provide a magnetostrictive sensor axially between these two elements on the drive shaft.

In order to be able to detect the total torque transmitted by the shaft at any time or also in an averaged fashion, it is also advantageous to provide at least one magnetostrictive sensor between each of the driving cranks and the output element.

In the case of a bicycle, for example, it is found that due to the physiological and physical basic conditions a cyclist does not drive the two driving cranks/foot pedals with the same force simultaneously but rather in a periodically varying fashion and as a function of the angular position of the respective driving crank.

The torque which is applied by each of the driving cranks can be averaged chronologically at least over half a rotation of the drive shaft, and the torques of the two driving cranks can, for example, also be compared with one another in order to compensate asymmetries of the cyclist.

The magnetostrictive sensors each have one magnetic body, or advantageously even two magnetic bodies, composed of a permanently magnetic, magnetostrictive material. This material is defined by the fact that in the unloaded state the magnetization state is maintained and that, however, a change in the magnetic properties, and therefore a change in the leakage field outside the magnetostrictive body, is produced when any deformation occurs. As a result, by confirming the leakage fields it is possible to confirm deformations and therefore also flexural moments or torsional moments acting on the magnetostrictive bodies.

The corresponding magnetostrictive bodies can be embodied in such a way that the magnetic flux runs essentially within the body, and a leakage field occurs on the outside ideally only if a torsional moment or flexural moment is applied.

The corresponding bodies can, for example, be bonded, soldered or welded onto the drive shaft, but they can also be bonded or soldered, welded or pressed into a recess.

Since many types of steel meet the conditions for the magnetostrictive effect, it is also possible to provide for the use of an axial section of the drive shaft as a magnetostrictive body by means of corresponding premagnetization. This can be done, for example, by virtue of the fact that the drive shaft is permeated with a high pulse-like current in order to achieve a high level of magnetization in the circumferential direction of the current path by virtue of Ampere's law.

The magnetized axial section of the drive shaft therefore performs the function of the magnetostrictive bodies described above, specifically that of being signal generators of at least one magnetostrictive sensor.

A plurality of magnetostrictive bodies can, for example, be embodied concentrically as cylindrical bodies and magnetized in opposite directions in the circumferential direction so that the magnetic leakage fields very largely compensate one another in the basic state. If such a magnetostrictive sensor, which is composed of two magnetostrictive bodies, is twisted with the drive shaft, an axial leakage magnetic field component, for example, is produced which can be detected with a magnetic field sensor.

It is also advantageously possible to provide that two magnetostrictive bodies of a sensor are arranged lying axially one behind the other. Said magnetostrictive bodies can, for example, be magnetized in opposite directions. What are referred to as pinning regions, which fix the magnetic flux, can be provided in the axial edge regions of the magnetostrictive bodies.

The above statements relating to one or more magnetostrictive bodies as signal generators for magnetic field sensors apply correspondingly if the at least one axial section of the drive shaft itself has magnetization and serves as a signal generator for one or more magnetic field sensors.

If an axial section of the drive shaft is embodied as a signal generator for at least one magnetic field sensor, there is preferably provision that the axial section comprises a first region near to the surface and a second region remote from the surface, wherein the region near to the surface has a first magnetization and the region remote from the surface has a second magnetization such that in the unloaded state of the drive shaft, if no external torque occurs, the first magnetization and the second magnetization cancel one another out in terms of magnitude and direction in such a way that no magnetic field occurs outside the drive shaft. However, the first and second magnetizations are coordinated in terms of their magnitude or as a result of the dimensioning of the two regions in such a way that the two magnetizations no longer cancel one another out as soon as a mechanical stress, for example a torque acting on the drive shaft, occurs. In this case, a magnetic field occurs outside the drive shaft and is detected by one or more magnetic field sensors.

There is preferably provision for the axial section, provided with a premagnetization, of the drive shaft that on at least one side, preferably on both sides of the axial section of the drive shaft, what are referred to as pinning zones are provided in the longitudinal extent of the drive shaft, that is to say regions are provided in which the magnetic field decreases significantly, with the result that in the longitudinal direction of the drive shaft, the magnetic field of the axial section is essentially limited thereto, and leakage fields in the longitudinal direction of the drive shaft are suppressed. Said pinning zones can be obtained by a high-intensity current pulse, in a way similar to the axial section provided with the premagnetization, of the drive shaft.

Of course, magnetostrictive bodies and/or axial sections, provided with premagnetization, of the drive shaft constitute equivalent alternatives which can also be provided in combination with one another in order to embody two or more signal generators for magnetostrictive sensors. Even if the following statements refer explicitly to magnetostrictive bodies, they also apply correspondingly to the case in which an axial section of the drive shaft has premagnetization, that is to say to the case in which the drive shaft itself is embodied in certain sections as magnetostrictive body.

As a result of the magnetic leakage field components which are thus generated in the case of loading/torsion, which can be oriented differently and which are detected with different magnetic field sensors, it is possible to compensate interference fields by taking them into account computationally. For example, the earth's magnetic field can be calculated in this way.

In order to achieve a higher level of accuracy it is also possible to use more than two, for example up to eight, such magnetostrictive bodies with corresponding magnetic field sensors.

The magnetic field sensors can basically have the known methods of functioning such as those, for example, of a Förster probe or of a Hall sensor.

It has proven particularly advantageous that a magnetic field sensor has at least one electrical coil with a ferromagnetic core, said coil being connected to an alternating current source for the purpose of alternating magnetization of the core up to saturation.

Such an alternating method of determining the flux density which is to be generated up to saturation permits the strength of the leakage field to be determined particularly precisely with particularly little expenditure. The measurement can also be carried out particularly quickly since the alternating magnetic field saturations can easily be achieved in the kilohertz range.

The magnetic field sensors supply, as their measurement result, a magnetic field strength which can be further processed in order to acquire a flexural moment or torque.

The magnetic field sensors are advantageously arranged in a positionally fixed fashion with respect to the drive shaft, in a bicycle, for example, in the bottom bracket cartridge or in the casing of the bottom bracket or attached to an outer ring of the corresponding roller bearing of the drive shaft.

Said magnetic field sensors are connected to an evaluation device which assigns corresponding torque values to the magnetic field values on the basis of a measured value table which is stored in a memory device. It is also conceivable to use a simple computational rule in order to respectively determine torques from the measured magnetic field strengths.

The evaluation device can also determine chronologically sliding average values so that the average torque can be determined for each driving crank, for example over a half rotation of the shaft and also summed for the drive shaft.

In addition, the torque can also be measured in the output train so that any losses can also be calculated.

If, in addition, the rotational speed of the drive shaft or the speed of the bicycle is measured, it being possible to determine the rotational speed from the latter, the power can also be calculated by taking into account the corresponding torques.

The evaluation device is advantageously connected to an analysis device in which threshold values for torques are stored in a memory device and compared with measured torque values by means of a comparison device.

The analysis device itself can be connected to a control device which can be connected to an additional drive and/or a brake device of an ergometer or a shifting device for a transmission.

If a specific torque about the drive shaft or at a driving crank is exceeded, the analysis device can decide to limit the torque, for example by changing a transmission ratio at the load element. This can mean, in the case of a bicycle, that, for example, a lower gear speed is shifted when there are excessively high torques.

The corresponding switching thresholds can relate both to instantaneous values of the measured torque and to sliding average values.

The decisions can also be made taking into account the rotational speed or the power which is calculated from the rotational speed and the torque.

Likewise, the corresponding thresholds of the torque can be used to connect an additional drive in the case of a bicycle, for example in the form of an electric drive, or to decrease or increase the stepping resistance in the case of an ergometer.

If the direction of the applied torque changes, it is possible, in particular during operation of a bicycle, to conclude that braking is intended and commands for the brake device are derived from this information so that, for example, an additional brake can be activated.

In the described applications, the measurement of torques in the drive shaft permits a variety of control possibilities and the arrangement of the corresponding magnetostrictive sensors in the region of the drive shaft means at the same time that the sensors are well protected against environmental influences by the encapsulation of the shaft. As a result, malfunctions are also avoided and damage to the sensors becomes improbable.

BRIEF DESCRIPTION OF THE DRAWINGS

The invention is shown below in a drawing by means of an exemplary embodiment and subsequently described.

In the drawing.

DETAILED DESCRIPTION OF THE INVENTION

Figure 1:
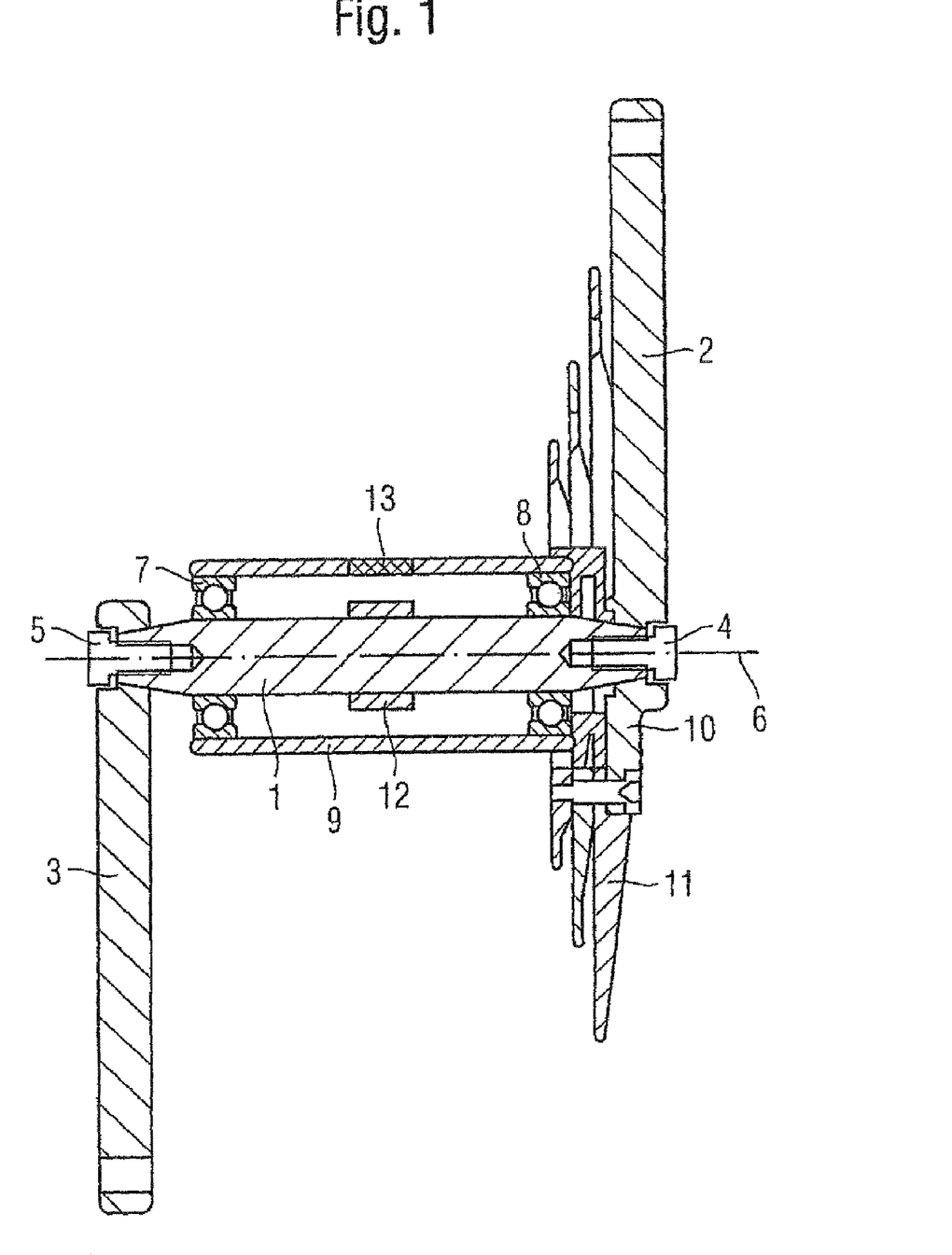
FIG. 1 shows a cross section of a drive shaft comprising two driving cranks such as are used in a bicycle.

FIG. 1 shows a drive shaft 1 of a bicycle, which drive shaft is permanently connected in an angularly rigid manner at each of its ends to a driving crank 2, 3 each, in this context also referred to as a foot pedal, by means of a screwed connection 4, 5 in the circumferential direction with respect to the axis 6. The shaft 1 is mounted in two bearings 7, 8, which are embodied as ball bearings, and said shaft 1 is accommodated in a protected fashion in a bottom bracket casing 9.

The unit composed of the bearings 7, 8 and the shaft 1 can additionally also be combined in what is referred to as a bottom bracket cartridge.

The drive shaft 1 is connected via a crank star 10 to a gear ring or a set of gear rings 11 which constitute the output element and drive a chain of the bicycle.

A magnetostrictive body 12 in the form of a sleeve is mounted, for example soldered or shrunk fit onto the shaft, axially in the center thereof. This sleeve forms part of a magnetostrictive sensor, the second part of a magnetic field probe 13 of which serves to monitor special magnetic field components of the leakage field of the magnetostrictive body 12. For example, the magnetostrictive body 12 can be permanently magnetized as a permanent magnet in the circumferential direction, with the result that the magnetic flux lines circulate within the body and are closed. Virtually no leakage field toward the outside then occurs in the torque-free state.

Accordingly, the magnetic field sensor 13 is not able to confirm any magnetic field components in this state.

If the shaft 1, and, therefore, also the magnetostrictive body, are subjected to torsion, the magnetostriction effect results in additional magnetic field components which generate a changed leakage field outside the magnetostrictive body. Said magnetic field components can be detected by means of the magnetic field sensor 13 and are a measure of the deformation as a result of the torsion of the shaft 1.

By means of the magnetostrictive body 12 it is therefore possible to detect a torque which is transmitted between the driving crank 3 and the output, on the opposite side of the shaft 1.

Figure 2:
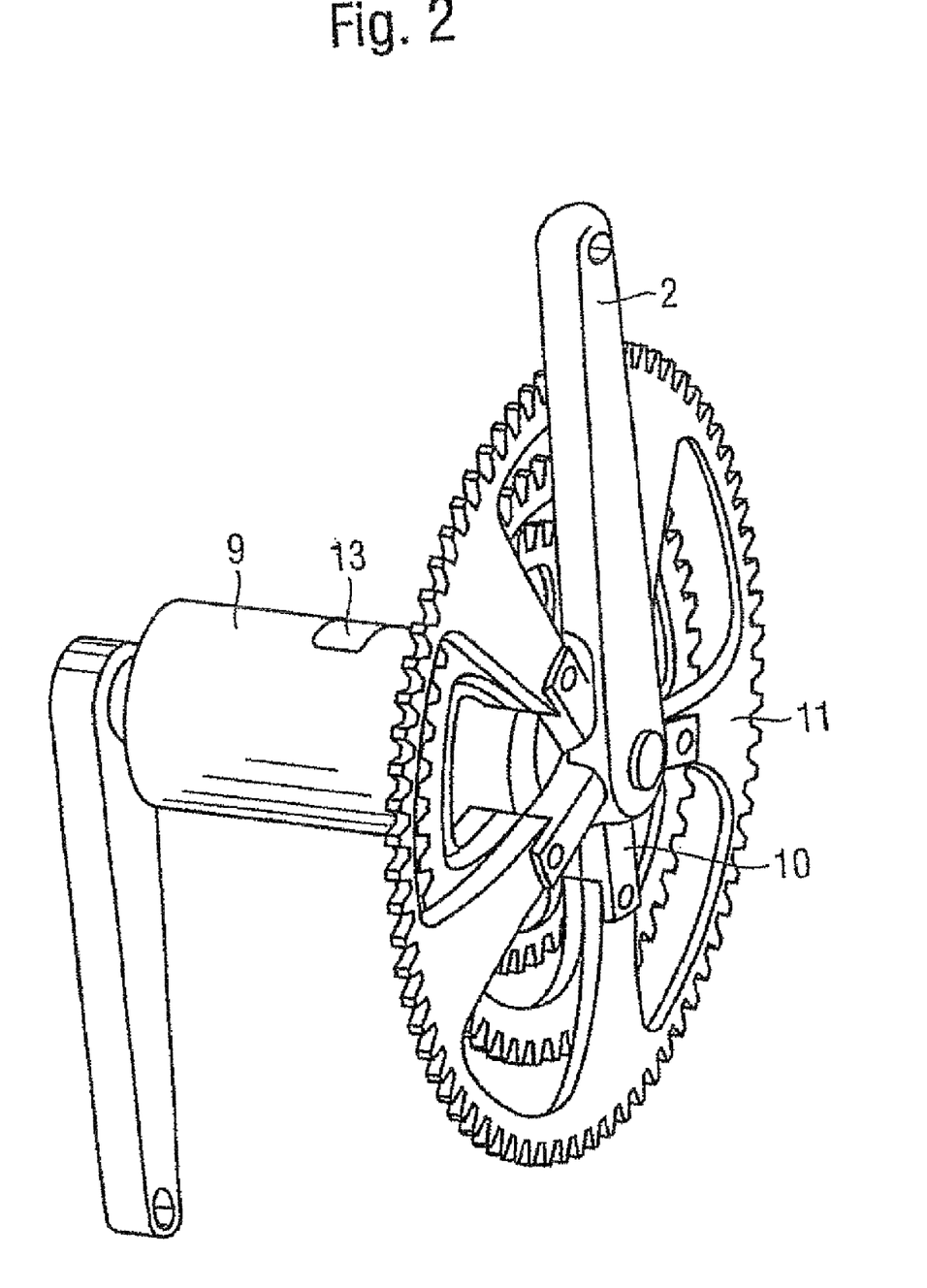
FIG. 2 is a three-dimensional view of the arrangement in FIG. 1.

FIG. 2 illustrates, in a three-dimensional illustration, a gear ring 11 or a set of gear rings, forming part of a shiftable transmission.

Furthermore, a crank star 10 can be seen which is structurally coherent with the driving crank 2 and corresponding spokes of the gear rings are screwed to the spokes of said driving crank 2.

The crank star can be connected directly to the driving crank 2 or attached to the shaft 1 in a rotationally fixed fashion.

The casing 9 of the bottom bracket, comprising a magnetic field sensor 13 which has, for example, an electrical coil, is also illustrated. For compensation purposes a plurality of coils with corresponding cores can also be provided, wherein the cores become demagnetized at a high frequency due to impression of an alternating current, wherein a magnetic field strength which is to be detected becomes apparent by virtue of the fact that the current strengths, which are to be additionally generated for the purpose of saturation, are different in the two directions of magnetization. The detected magnetic field strength can be determined from this asymmetry.

However, it is also conceivable to use commercially available magnetic field probes such as, for example, Hall sensors or Förster probes.

Figure 3:
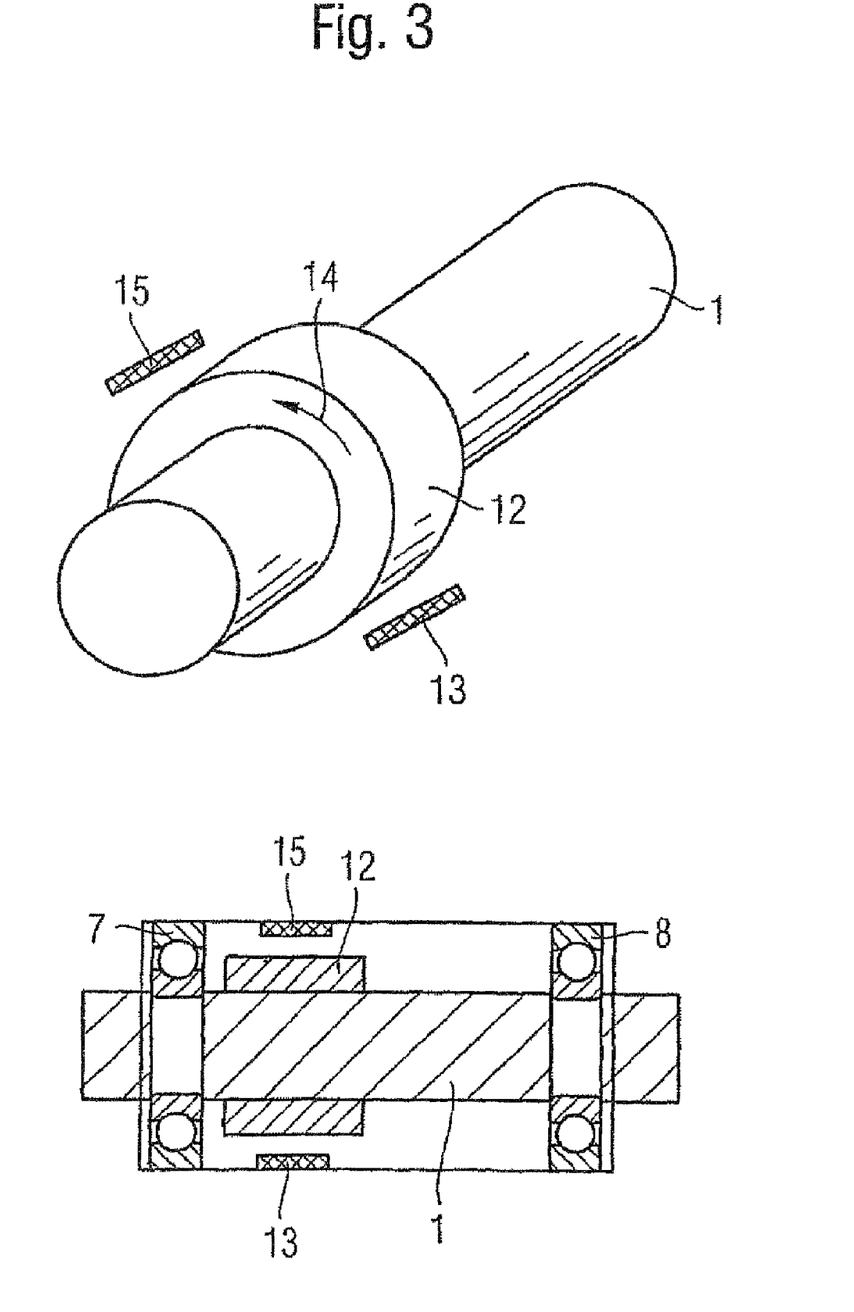
FIG. 3 shows the basic function of the magnetostrictive sensors.

FIG. 3 shows, in the upper part, a three-dimensional view of a shaft 1 with a magnetostrictive body 12 which is fitted thereon as a sleeve and in which magnetic flux lines circulate in a closed fashion in the circumferential direction, indicated by the arrow 14.

Two magnetic field sensors 13, 15, which can detect leakage magnetic field components, are illustrated on the circumference of the shaft, offset by 180°.

In the lower part in FIG. 3, the configuration is illustrated with corresponding bearings and a bottom bracket cartridge in a longitudinal section. The bearings are denoted by 7, 8, and the corresponding torques are each input at the ends of the shaft 1 by means of driving cranks and are transmitted to an output element (not illustrated in more detail) lying between the driving cranks.

The magnetostrictive sensor 12, 13, 15 can, however, detect torsions only if the part of the shaft on which the magnetostrictive body 12 is arranged actually transmits torque, which is only the case when it is arranged axially between the location at which the torque is input and the output element.

Figure 4:
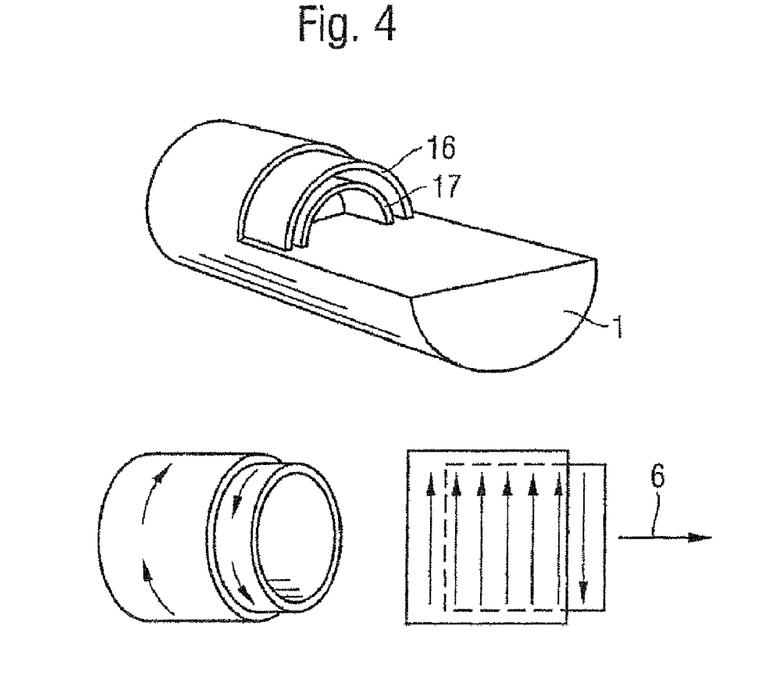
FIG. 4 shows an arrangement comprising two concentric magnetostrictive bodies.

FIG. 4 is a schematic illustration of a possible arrangement comprising a plurality of magnetostrictive bodies, wherein two concentric, hollow-cylindrical magnetic bodies 16, 17 are provided, viewed axially on a short section of the shaft 1, said magnetic bodies 16, 17 being permanently magnetized in opposite directions in the circumferential direction, as illustrated in the left-hand lower part of FIG. 4.

As a result of this configuration, possibly remaining leakage fields cancel one another out in the unloaded state, and at any rate no magnetic field components, which are directed in the axial direction of the shaft 1, occur.

In the lower right-hand part of FIG. 4, an unrolling of the bodies 16, 17 is shown, indicating that the magnetic flux does not have any component in the axial direction 6 of the shaft.

Figure 5:
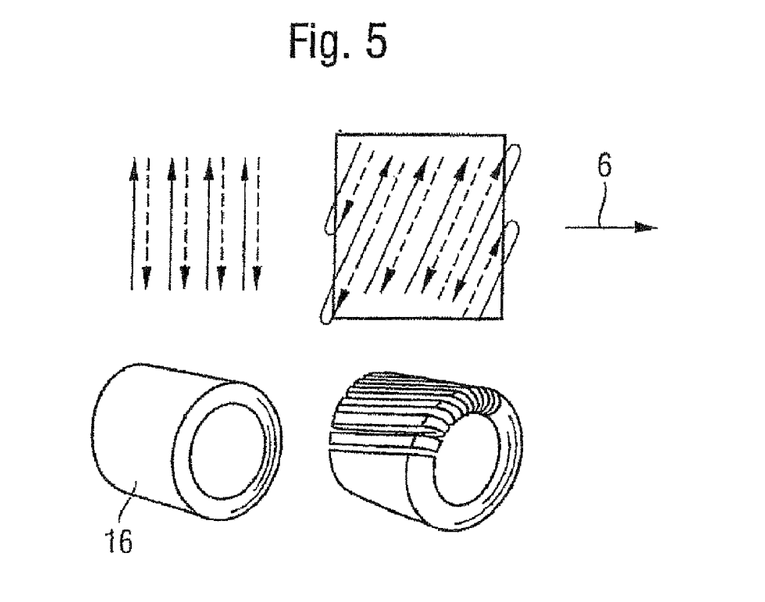
FIG. 5 is a schematic view of the changing of the magnetic field as a result of the magnetostrictive effect.

FIG. 5 shows in the left-hand part of the illustration a hollow-cylindrical magnetostrictive element 16 in the unloaded state, and above it the unrolling with the symbolic indication of the magnetic flux lines exclusively in the circumferential direction.

In the right-hand part of the figure, the twisted state of the magnetostrictive body, in which it is loaded with a torque, is shown, wherein defined pieces of material which run axially in the unloaded state form helical cutouts from the hollow-cylindrical body 16 in the loaded state.

As a result, additional axial components of the magnetic flux are produced, as is apparent from the illustration in the right-hand upper part in FIG. 5, said axial components leading to the production of axial components of the leakage magnetic field.

Said axial components of the leakage magnetic field can easily be detected by means of magnetic field sensors.

Figure 6:
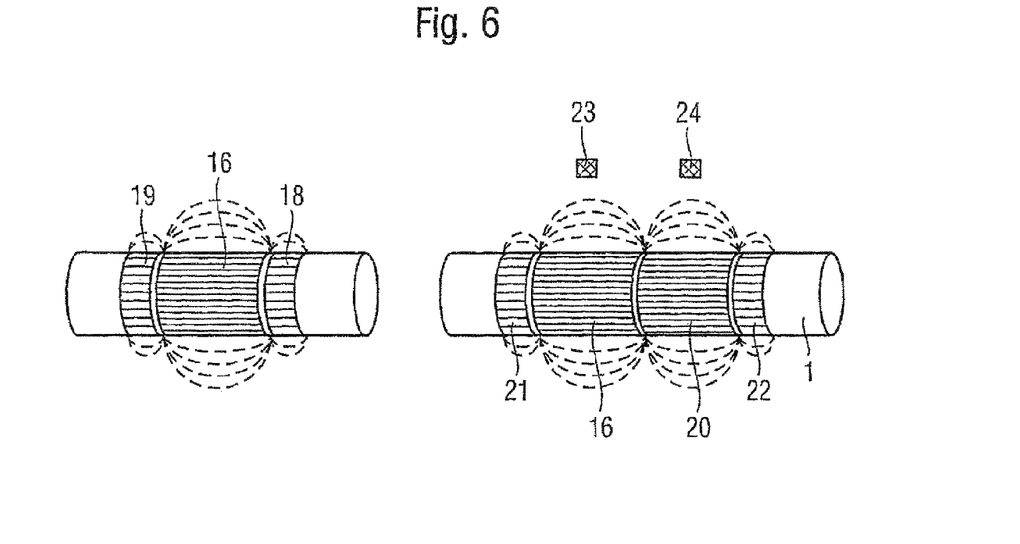
FIG. 6 shows an arrangement of two magnetostrictive bodies axially one behind the other.

FIG. 6 shows a variant in which, in the left-hand part of the figure, a sleeve 16 is let into the shaft or is embodied as part of the shaft provided that the latter is composed of a suitable magnetostrictive material.

What are referred to as pinning regions 18, 19, which stabilize the magnetic field, are provided axially on both sides of the magnetostrictive body 16.

Partially axially directed leakage fields, which occur during torsional loading and are detectable, are indicated as dashed lines.

In the right-hand part of the figure two sleeves 16, 20 are arranged axially one behind the other on the shaft 1, wherein the magnetization of the sleeves 16, 20 is set in each case in the circumferential direction of the shaft 1 but in opposite directions to one another.

Pinning regions 21, 22 for stabilizing the magnetic field are provided on both sides of the magnetostrictive bodies 16, 20.

As a result of this arrangement, the anisotropy effects during the magnetostriction produce axially directed leakage magnetic field components in respectively opposite, axial directions. These can be detected by means of two magnetic field sensors 23, 24, wherein interference fields can be partialed out or compensated. With a combination of a plurality of magnetostrictive bodies it is therefore possible to achieve a higher degree of measuring precision.

Figure 7:
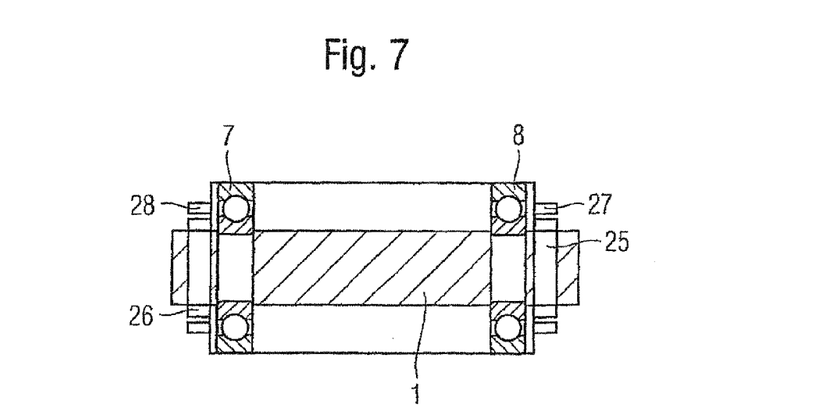
FIG. 7 shows the longitudinal section through a drive shaft with two magnetostrictive sensors.

FIG. 7 shows a configuration in which the drive shaft 1 is mounted in the bearings 7, 8, and two magnetostrictive bodies 25, 26 are arranged axially in the region outside the intermediate space of the bearings 7, 8. Each of the magnetostrictive bodies is assigned a magnetic field sensor 27, 28 for measuring the leakage field components and therefore for detecting the torque which is present.

If the output element of the drive shaft lies between the magnetostrictive bodies 25, 26, the torque which is input via both ends of the shaft can be respectively determined on an individual basis between the driving crank and the output element. As a result, it is also easily possible to determine the sum of the torques acting on the drive shaft, which sum is decisive for the overall loading and for the power provided.

Figure 8A:
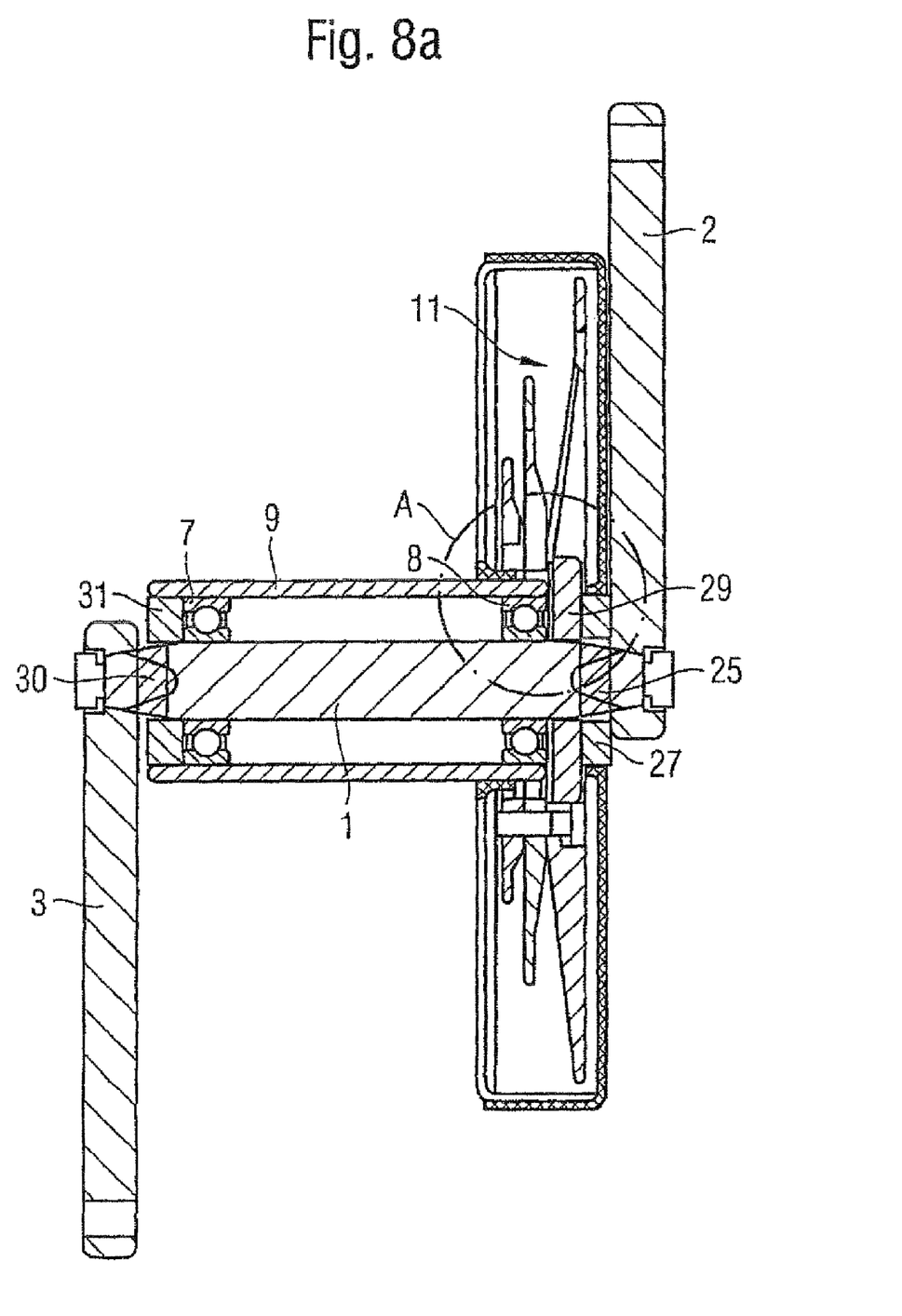
FIG. 8*a* shows a first way of implementing the configuration in FIG. 7.
Figure 8B:
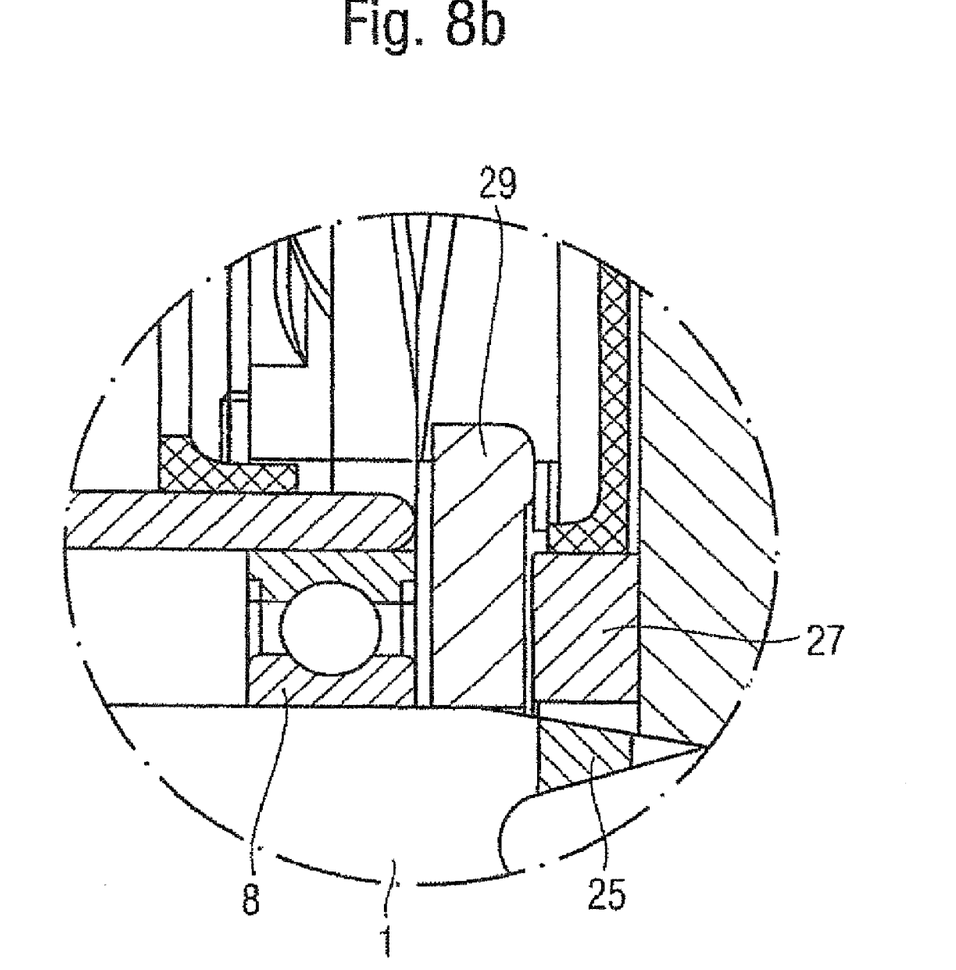
FIG. 8*b* shows the part circled in FIG. 8*a* on an enlarged scale.

FIG. 8*a* shows a longitudinal section through a bottom bracket arrangement comprising a shaft 1, metal housing 9 of the bottom bracket, ball bearings 7, 8 and driving cranks 2, 3.

In this structure, the drive torque is input into the shaft 1 by means of the driving cranks 2, 3, and the output element is directly connected to the shaft 1 in a rotationally fixed fashion as a disk or foot pedal star 29. On the other side, the gear rings 11 are connected to the crank star 29.

The torque is therefore transmitted axially on one side from the driving crank 2 to the crank star 29 via the drive shaft 1, with the result that a magnetostrictive body 25 can be arranged axially between these elements. Said magnetostrictive body 25 is integrated into the shaft 1 and surrounded by a sensor ring 27 with one or more magnetic field sensors. The torque which is transmitted from the driving crank 2 to the output element 29 can therefore be measured by means of this sensor.

The torque which is transmitted between the driving crank 3 and the output element 29 can be detected without problems with a magnetostrictive body 30 located axially in front of the bearing 7, but theoretically also anywhere between the bearing 7 and the bearing 8. In the figure, the second magnetostrictive body 30 is illustrated in the vicinity of the driving crank 3 and is also surrounded by a sensor ring 31 with one or more magnetic field sensors.

Figure 9:
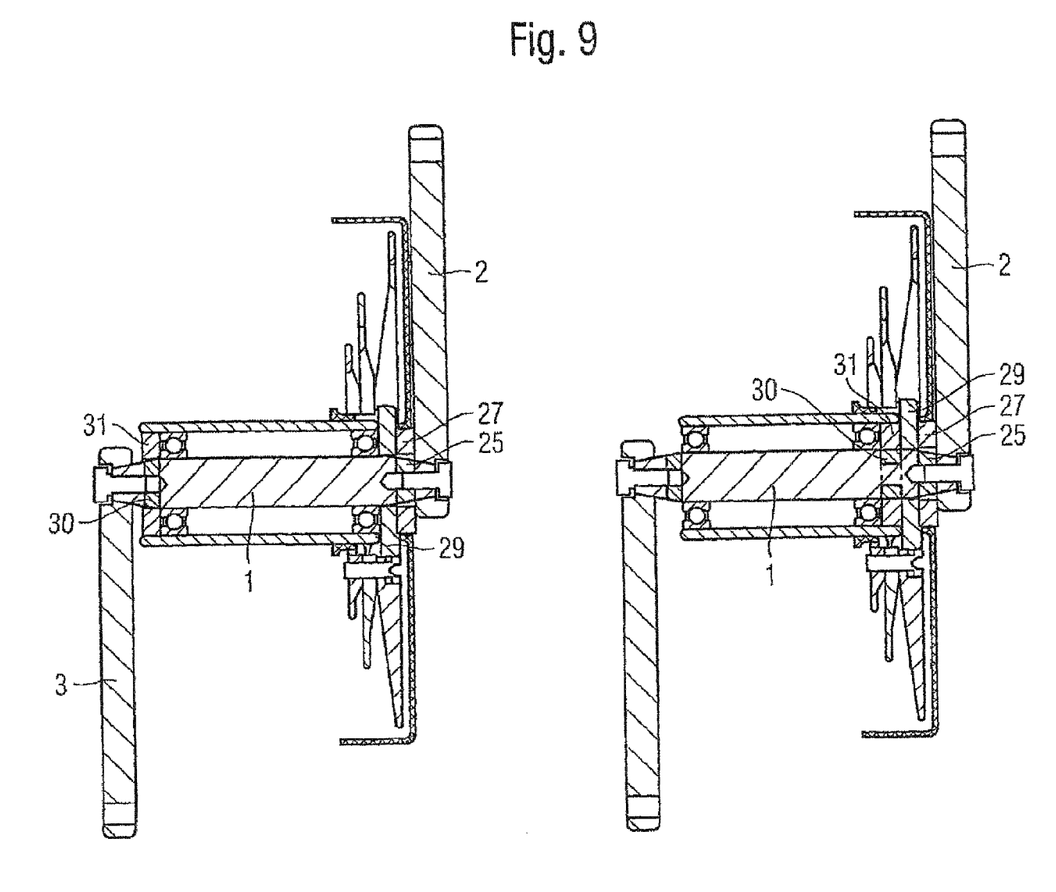
FIG. 9 shows a second embodiment similar to the configuration in FIG. 7.

In FIG. 9, two variants are compared with one another in the left-hand and right-hand halves of the illustration, wherein, in the right-hand variant, the magnetostrictive bodies are illustrated on both sides axially directly next to the output element 29 and are surrounded in each case by sensor rings 27, 31. The magnetostrictive bodies are denoted by 25, 30.

In comparison with this, in the left-hand part of the figure the magnetostrictive bodies are arranged, on the one hand, between the output element 29 and the driving crank 2, wherein the magnetostrictive body is again denoted by 25, and the sensor ring by 27. On the other hand, a second magnetostrictive sensor is arranged in the direct vicinity of the driving crank 3, said sensor being denoted by 30 and also being surrounded by a sensor ring 31.

Both variants are equivalent for determining the two torques which are input into the drive shaft 1 by the driving cranks 2, 3.

Figure 10:
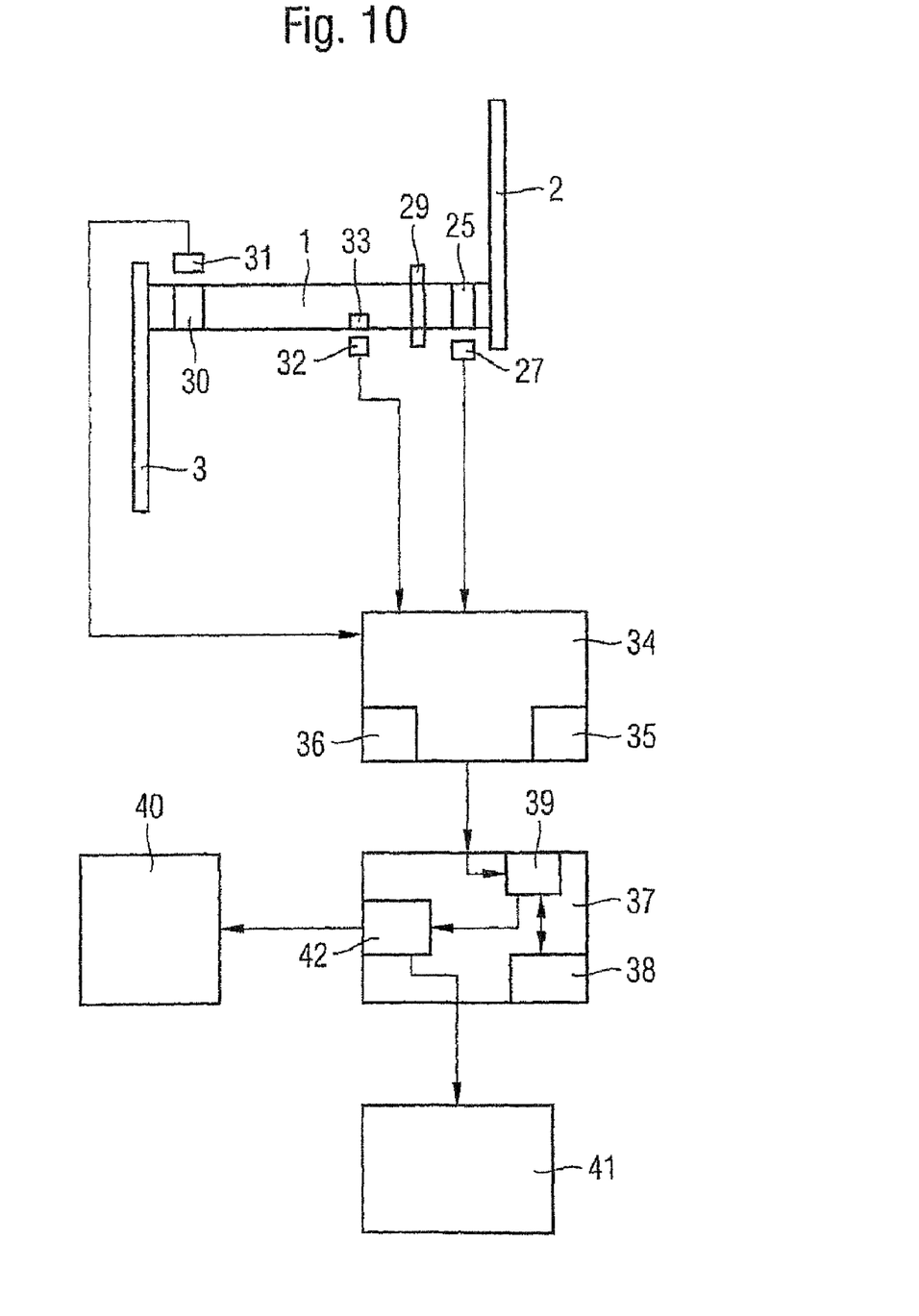

FIG. 10 is a schematic view of a drive shaft 1 with two magnetostrictive bodies 25, 30 and corresponding magnetic field sensors 27, 31 as well as driving cranks 2, 3 and an output element 29.

A rotational speed sensor 32, which interacts with an element 33 attached to the shaft, is additionally illustrated.

The magnetic field sensors 27, 31 are connected to an evaluation unit 34. A memory device 35 is provided in said evaluation unit 34, said memory device 35 containing a value table by means of which torque values can be individually assigned to the respective measured magnetic field strengths. As a result, the torque values can be detected instantaneously in the axial direction on both sides of the output element 29 and can also be averaged chronologically. They can be added in order to calculate an overall torque, or else subtracted in order to detect possible asymmetries between the torques which are input from the left and those which are input from the right.

A rotational speed can be determined by means of the rotational speed sensor 32 through interaction with a time base 36, which rotational speed can be used together with the detected torque values to determine the performance.

The corresponding evaluated data are passed on to an analysis device 37 in which threshold values for specific control options are stored. Said threshold values are stored in a second memory device 38 and are compared with the measured values by means of a comparison device 39.

In this context, it is possible to compare performance data, instantaneous torque values or chronologically averaged torque values.

Reaction options available for a control device 42 are the activation of a shifting device 40 in order to change a transmission ratio or the actuation of an additional drive 41, for example an electric drive in the case of a bicycle.

As a result, by means of the invention it is easily possible and without basically intervening in the design of a machine to measure the torque at the drive shaft at one or more locations and to activate an assistance function by means of a control device, so that, for example in the application in bicycles, it is possible to provide the rider with better riding comfort.

The drive device described above can also comprise a transmission device for the detected measured values. In this context, the transmission device transmits the detected measured values, for example, by radio or by IR signal to a receiver which is arranged outside the machine.

List Of Reference Numerals

1 Drive shaft
2, 3 Driving crank
4, 5 Screwed connection
6 Axis
7, 8 Bearing
9 Bottom bracket casing
10 Crank star
11 Gear rings
12, 25, 26 Magnetostrictive bodies
13, 15, 23, 24, 27, 28 Magnetic field sensor
16, 17, 20 Hollow-cylindrical magnetic bodies, sleeve
18, 19, 21, 22 Pinning regions
29 Foot pedal star
30 Magnetostrictive body
31 Sensor ring
32 Rotational speed sensor
33 Evaluation unit
35 Memory device
36 Time base
37 Analysis device
38 Memory device
39 Comparison device
40 Shifting device
41 Additional drive

The invention claimed is:

1. A drive device, comprising:
a drive shaft mounted so as to rotate about an axis;
two driving cranks connected to the drive shaft in a circumferential direction with respect to the axis in an angularly rigid manner; and
an output element, which is connected to the drive shaft, transmitting torque between the drive shaft and a load element,
wherein at least one magnetostrictive sensor is permanently connected to the drive shaft and is arranged axially between a driving crank and the output element,
wherein at least one axial section of the drive shaft is formed as part of the magnetostrictive sensor by magnetization,
wherein the at least one axial section of the drive shaft comprises a first region, near to a surface, with a first magnetization and a second region, remote from the surface, with a second magnetization, and
wherein the first magnetization and the second magnetization are added in a mechanically unloaded torque-free state of the drive shaft to form an essentially vanishing magnetic field outside the drive shaft.

2. The drive device of claim 1, wherein the magnetostrictive sensor is arranged axially between each of the driving cranks and the output element.

3. The drive device of claim 1, wherein the magnetostrictive sensor has at least two magnetostrictive bodies.

4. The drive device of claim 3, wherein the magnetostrictive bodies are embodied as concentric cylindrical bodies.

5. The drive device of claim 4, wherein the magnetostrictive bodies are magnetized in opposite directions in an unloaded state.

6. The drive device of claim 3, wherein the magnetostrictive bodies are arranged lying axially one behind the other.

7. The drive device of claim 6, wherein magnetic field components are generated with the magnetostrictive bodies by means of torsion have different directions.

8. The drive device of claim 1, wherein a pinning zone is arranged on at least one side of the axial section, provided with the magnetization, of the drive shaft, said pinning zone limiting a magnetic field, which can be measured outside the drive shaft, of the axial section essentially to a region of the axial section.

9. The drive device of claim 1, wherein a magnetic field sensor for measuring magnetic leakage field is assigned to each magnetostrictive sensor.

10. The drive device of claim 9, wherein a magnetic field sensor is assigned to each magnetostrictive body and/or each axial section, provided with a magnetization, of the drive shaft.

11. The drive device of claim 9, wherein the magnetic field sensor has at least one electrical coil with a ferromagnetic core, said coil being connected to an alternating current source for alternating magnetization of the core up to saturation.

12. The drive device of claim 9, wherein the magnetic field sensor is arranged in a positionally fixed fashion with respect to the drive shaft.

13. The drive device of claim 1, further comprising an evaluation device which is connected to the magnetic field sensors and assigns torque values to the measured magnetic field values.

14. The drive device of claim 13, further comprising an analysis device in which threshold values for torques are stored in a memory device and are compared with measured torque values by means of a comparison device.

15. The drive device of claim 14, further comprising a control device which is connected to the analysis device on the one hand, and to an additional drive and/or a shifting device for a transmission, on the other.

16. The drive device of claim 1, further comprising a transmission device which transmits sensed measured values to a receiver by radio or IR signal.

17. A device which can be driven by means of at least one driving crank, comprising a drive device as claimed in claim 1.

18. The device of claim 17, wherein the device is a bicycle, an ergometer or a pedelec.

* * * * *